United States Patent [19]

Crampton et al.

[11] Patent Number: 4,591,581

[45] Date of Patent: May 27, 1986

[54] METHOD FOR MAKING ABSORBENT MATERIALS

[75] Inventors: John R. Crampton, East Grinstead; Howard Whiting, Redhill, both of United Kingdom

[73] Assignee: Laporte Industries Limited, London, England

[21] Appl. No.: 461,737

[22] Filed: Jan. 28, 1983

[51] Int. Cl.$^4$ .................. B01J 21/08; A01K 1/015
[52] U.S. Cl. ................... 502/407; 502/415; 119/1
[58] Field of Search ............ 252/455 R; 502/80, 407, 502/414, 415; 501/141, 145, 147; 119/1

[56] References Cited

U.S. PATENT DOCUMENTS

| | | | |
|---|---|---|---|
| 1,760,289 | 5/1930 | Stoewener et al. | 502/407 |
| 2,292,632 | 8/1942 | Greger | 502/407 |
| 2,391,116 | 12/1945 | Ashley | 502/407 |
| 2,605,236 | 7/1952 | McCants | 502/407 |
| 2,635,991 | 4/1953 | Briggs | 502/407 |
| 2,665,259 | 1/1954 | Buffett | 252/455 R |
| 3,244,635 | 4/1966 | Duke | 252/455 R |
| 3,579,464 | 5/1971 | Rosen et al. | 502/407 |
| 3,921,581 | 11/1975 | Brewer | 119/1 |
| 3,960,771 | 6/1976 | Tanaka et al. | 502/80 |
| 3,966,641 | 6/1976 | Csatar et al. | 252/455 R |
| 3,996,162 | 12/1976 | McCall | 502/407 |
| 4,163,674 | 8/1979 | Been | 106/15.85 |
| 4,187,803 | 2/1980 | Valenta | 264/118 |
| 4,366,090 | 12/1982 | Caries | 502/407 |
| 4,402,756 | 9/1983 | Prine | 502/80 |
| 4,459,368 | 7/1984 | Jaffee et al. | 502/80 |

Primary Examiner—John Doll
Assistant Examiner—Anthony McFarlane
Attorney, Agent, or Firm—Kane, Dalsimer, Kane, Sullivan and Kurucz

[57] ABSTRACT

A process for the manufacture of adsorbent clay mineral particles comprises first selecting clay mineral particles smaller than 2 millimeter in size, drying the clay mineral particles to a moisture content not exceeding 15% by weight and mixing the dried particles with from 0.2% to 5% by weight of a water dispersible colloid in water to form a mixture having a final moisture content not exceeding 15% by weight. The mixture is compacted in a press and the compacted material broken into masses of particles larger in size than the selected clay mineral particles and in the 710 micron to 4 millimeter size range. The product of the process is useful for example as a litter.

13 Claims, No Drawings

METHOD FOR MAKING ABSORBENT MATERIALS

BACKGROUND OF THE INVENTION

1. Field of the Invention

This invention relates to absorbent material based on clay minerals.

2. Brief Description of the Prior Art

Clay minerals in particulate form are commonly used to absorb liquids. For such use the clay is mined or quarried and the resulting so-called raw clod is crushed to produce for example, largest particles of the size order of about 1–3 cm, is dried if necessary to render it capable of absorbing a reasonable quantity of liquid, for example to a water content of not more than 20% by weight and preferably about 5% to 15% by weight, and is screened, which usually also involves some breakdown of the clay particles which have become physically weaker during the drying process, to give a final product in about the 710 microns to 4 mm size range or thereabouts. Reference hereafter to a material having a specific size range is to the majority and preferably at least 75% by weight of the material being in the form of particles having sizes within that range unless otherwise stated. The size ranges stated are, where appropriate, conversions into nominal aperture widths in metric units of British Standard mesh size ranges (see British Standard 410.1962) and should be interpreted accordingly.

The resulting particulate clay mineral product is useful for absorbing aqueous liquids a major use being as a pet for example cat litter. For such a use the liquid capacity of the absorbent is of the greatest importance if a product is to be acceptable to the purchaser since it determines the frequency with which the absorbent, in use, must be changed for fresh material.

SUMMARY OF THE INVENTION

The invention comprises absorbent material comprising clay particles in the 710 microns to 4 mm size range characterized in that the particles comprise compacted masses of smaller particles of the clay mineral smaller than 2 mm in size range.

DETAILED DESCRIPTION OF THE PREFERRED EMBODIMENTS OF THE INVENTION

According to one aspect thereof, the present invention provides absorbent material comprising clay mineral particles characterised in that the particles comprise compacted masses of relatively smaller particles. The compacted particles are very suitably in the 710 microns to 4 mm size range and comprise preferably fractions in the 1.68 mm to 4 mm and 710 microns to 1.68 mm ranges preferably in a ratio of 2–12:1, particularly preferably in a ratio of 5–12:1 and ideally in a ratio of 7:1. The relatively smaller particles of which the compacted particles are made up are preferably in the smaller than 2 mm range, particularly preferably in the smaller than 1.68 mm range and very suitably in the 105 microns to 710 microns size range. It has been found that such compacted particles can have a substantially higher absorbency than particles prepared from raw clod as described above.

The fine particles required for the practice of the above aspect of the invention may be produced by suitably grinding the raw clod or the dried particles subjected to screening. Very suitably, however, the fine particles may be fines removed in the course of processing clay minerals for other uses, thereby providing an economical use of such fines. To attain optimum properties in the resulting absorbent material the fine particles should preferably be dried to the final required moisture content of preferably, not more than 15% wt before compaction. It is thought that this, and the use of pressure compaction to form the absorbent particles, materially contributes to the properties of the absorbent particles in use. Clearly, however, if the fine particles are too dry, e.g. materially below 5% wt moisture, the effects of compaction may be affected adversely.

The compaction of the fines may be performed by a variety of presses suitable for use in relation to particulate materials. The use of a press operating by passing the material between rollers rotating in opposite directions, a roll press, however, has proved particularly efficacious in obtaining a suitable combination of physical strength and absorbency in the product. The fine particles are passed through rolls urged together under a total pressure of preferably at least 5 KN, particularly preferably at least 25 KN and preferably not more than 500 KN particulary preferably not more than 200 KN per cm of roll length. The rolls may be smooth, or profiled to produce either an elongated, for example a rod-shaped, compacted product or a compacted product of more equal dimensions. The compacted product is desirably broken up for example by passing it through further rolls, spaced slightly apart and with projecting members which intermesh in use of the rolls, and suitably screened to give the required final particle size with recycling of fines and oversized particles if, and to the extent, desired. Alternatively a normal piston and cylinder press, or the like, operating under similar pressures may be used.

It has, also been found according to the present invention, that a further marked increase in absorbency of the compacted particles may be attained by the use of a relatively restricted quantity of additive.

Additives which have been found efficacious according to the invention belong to the group of materials known for their effect as soil antiredeposition agents in the detergent field and the group of materials known for their property of gelling or thickening water, most of which go into the colloidal state in water. The materials belonging to these two groups of substances may be inorganic or organic compounds but, as is explained below, have in common at least certain members of a specific class of organic compounds.

The book "Synthetic Detergents" by Davidsohn and Milwidsky, Edition 6, published by George Godwin in 1978 ascribe soil antiredeposition properties, or the like property of encouraging soil particles to remain in suspension, to the following groups of substances:

(a) Soluble silicates, preferably those solid silicates which form colloids when dissolved in water such as Crosfield's "M" or "C" grade soluble powder.

(b) Condensed phosphates of which only the pyrophosphates are sufficiently stable in solution in water for practical use for example tetrapotassium pyrophosphate.

(c) Bentonite which is a clay belonging to the montmorillonite group, and which has the ability to form a gel, for example Wyoming bentonite.

(d) Carboxy methyl cellulose which has marked gel-forming abilities.

(e) Polyvinyl pyrrolidone.

A consideration of the above groups and the testing of representative members thereof led to the hypothesis that materials capable of thickening water, in general, could also be useful as additives in the present invention and the testing of certain representative members of groups of gel-forming substances confirmed this hypothesis. These groups of substances are as follows:

(f) Soluble polysaccharides, which group encompasses both the soluble cellulose ethers such as carboxy methyl cellulose, hydroxy ethyl cellulose, hydroxy propyl cellulose, ethyl hydroxy ethyl cellulose and methyl hydroxy propyl cellulose and the soluble gums which hydrate in water to form viscous sols or dispersions such as the alginates or starches of which last material a cold water dissolving grade would desirably be used.

(g) Natural or synthetic swelling clays which encompasses bentonite and also other swelling montmorillonites, such as that sold under the trade name VEEGUM by Vanderbilt Corp., and the synthetic hectorite sold under the trade name LAPONITE by Laporte Industries Limited which last material is also known for its soil antiredeposition properties in British Patent No. 1376379.

In the light of the above the additives used according to the present invention are therefore preferably water-soluble or dispersible materials selected from
(1) silicates, preferably alkali metal silicates
(2) pyrophosphates, preferably alkali metal pyrophosphates
(3) natural or synthetic swelling clays, preferably montmorillonites
(4) polysaccharides, preferably cellulose derivatives, alignates or starch
(5) Polyvinyl pyrrolidone Particularly, preferably the additives are selected from groups (1) or (4) above.

A swelling clay is defined as one which gives a Bingham Yield Value, referred to and as defined in U.S. Pat. No. 3,586,478 and in many other patents and textbooks, of at least 20 dynes/cm$^2$ as a 2% dispersion in water.

It is envisaged that one or more of the above defined additives be used, preferably, in less than 10% and, particularly preferably, less than 5% by weight of the compacted absorbent additive-containing particles. The effect of a given percentage of additive will tend to vary according to the particular additive, the particular clay mineral and the particular production conditions used. Excellent results have been obtained, however, using less than 4% of additive by weight of the compacted particles. The additive is present, preferably, in at least 0.2%, particularly preferably in at least 0.5%, by weight of the compacted particles.

The clay mineral utilised according to the present invention may, very suitably, be selected from the groups of smectites, attapulgite, sepiolite or the hormites in general. The smectites may be considered to consist of a notional series of minerals having structures intermediate to that of talc, $Si_8Mg_6O_{20}(OH)_4$, and pyrophyllite, $Si_8Al_4O_{20}(OH)_4$, talc and pyrophyllite themselves not being members of the group. As is usual in the clay mineral field some at least of the Mg or Al ions may be replaced by ions of lower valency and the resulting negatively charged structure may be associated with a cation such as an alkali metal cation. The X-ray diffraction pattern common to smectites is identified in "X-ray identification and crystal structure of clay minerals" Mineralogical Society, G. Brown, 1961. Preferably the smectite is an alkali metal or alkaline earth metal montmorillonite, for example such as that available from Laporte Industries Limited as Surrey Powder. Preferably, the clay mineral is not itself a swelling clay as defined above since such a characteristic could impair the physical integrity of the compacted absorbent particles.

The mixing of the additive with the clay mineral may suitably be accomplished in a hopper by means of a low speed mixer. The hopper may very suitably be the compactor feed hopper in which a feed screw can double as a mixer.

The invention will now be illustrated by means of the following non-limiting examples. In the examples a number of samples of clay mineral particles, as identified, where subjected to the following tests:

Absorbency % Test 10 g of clay mineral in its pre-dried state and containing approximately 10% by weight of moisture is placed in a sintered glass crucible and wetted by adding water to totally submerge the granules and the excess is poured off. After a delay of 10 minutes the crucible and contents are subjected to a partial vaccuum of 71 cm Hg. Under these conditions droplets of water are seen to leave the clay mineral. When no droplets have appeared for 1 minute the clay mineral is weighed and its increase in weight, due to absorbed water is expressed as a % of 10 g.

Watch Glass Test

There is a further test of absorbency which is particularly useful for the higher absorbency clay minerals. 20 ml of clay mineral is placed on a large watch glass and 20 ml water is added. When the water is absorbed the glass is inverted and if the water falls off, the clay mineral fails the test. If the water is not absorbed immediately the time taken to do so is noted. Further 2.5 ml increments of water are added. After each incremental addition of water the glass is inverted until the point is reached when the test is failed. The results are expressed as:

Pass—Immediate absorbtion of 20 ml $H_2O$. Water does not fall off on glass inversion.

Pass (secs)—where the 20 ml $H_2O$ was not absorbed immediately the number of seconds required for it to do so is noted followed by a Pass as defined above.

Pass (ml)—where the water fell off on inversion of the glass after one or more further increments of water was added the total quantity of water added is identified (20+2.5×No of increments)

In some cases the incremental extension of the test was not performed so an unqualified pass is not to be taken as an indication that a test involving the addition of a first further increment of water has been failed. Unless otherwise stated the particles tested consisted of an approximately 150 micron particle size fraction of clay mineral mixed with the additive indicated and converted into the 710 micron to 4 mm size range by compaction and breaking up as described above. The compactor used was a laboratory piston and cylinder compactor having an operating at a pressure of 5 KN/sq cm. Preferably the pressure is maintained within the range 0.5 KN to 50 KN particularly preferably 20 KN to 200 KN per sq cm when operating static press of this type.

The additives are expressed by weight of the compacted granules and are

Carboxy methyl cellulose (CMC)—Courlase 740G ex Courtaulds Ltd Courlase A 610 ex Courtaulds Ltd
Sodium silicate—Soluble grade M ex Crosfields Ltd
Sodium Alginate The test results are summarised in the following Table.

THE TABLE

| Ex No | Additive | Compacted | % Abs | Watch Glass |
|---|---|---|---|---|
| Tests on Calcium montmorillonite (Surrey Powder) | | | | |
| 1 | — | No | 69 | Pass (20 Sec) (i.e. 150 micron material) |
| 2 | — | Yes | 92 | Pass |
| 3 | CMC (F40G) 1% | Yes | 144 | Pass (30 ml) |
| 4 | CMC (F40G) 2% | Yes | 192 | Pass (27.5 ml) |
| 5 | CMC (F40G) 3% | Yes | 183 | Pass (25 ml) |
| 6 | CMC (A610) 1% | Yes | 119 | Pass (30 ml) |
| 7 | CMC (A610) 2% | Yes | 163 | Pass (32.5 ml) |
| 8 | CMC (A610) 3% | Yes | 184 | Pass (32.5 ml) |
| 9 | Sod. Silicate (M) 1% | Yes | 104 | Pass |
| 10 | Sod. Silicate (M) 2% | Yes | 113 | Pass |
| 11 | Sod. Silicate (M) 3% | Yes | 140 | Pass (22.5 ml) |
| 12 | Sod. Silicate (M) 4% | Yes | 108 | Pass (32.5 ml) |
| 13 | Sod. Silicate (M) 5% | Yes | 120 | Pass (32.5 ml) |
| 14 | Sod. Alginate (M) 1% | Yes | 140 | Pass (30 ml) |
| Test on Sepiolite | | | | |
| 15 | — | No | 79 | Fail |
| 16 | — | Yes | 151 | Pass (32.5 ml) |
| 17 | CMC 3% | Yes | 194 | Pass (32.5 ml) |
| 18 | Sod. Silicate (M) 3% | Yes | 201 | Pass (32.5 ml) |

The following tests were conducted on uncompacted relatively large particles of calcium montmorillonite containing no additive.

| Ex No | Size range (mm) | % Abs | watch glass |
|---|---|---|---|
| 19 | 1.68 to 4 | 69 | Pass (20 secs) |
| 20 | 2.80 to 4 | 69 | " |
| 21 | 0.710 to 1.68 | 69 | Pass |

In the tests of the compacted particles based on Surrey Powder the use of the following additives gave no appreciable improvement in comparison with compacted particles containing no additive:

Silica gel—3%
Polyvinyl alcohol—3%
Sodium aluminate—3%

We claim:

1. A process for the manufacture of adsorbent clay mineral particles suitable for use as a litter comprising selecting particles of the clay mineral smaller than 2 mm in size, drying the clay mineral particles smaller than 2 mm in size to a moisture content not exceeding 15% by weight while retaining at least a quantity of moisture to allow the formation of compacted masses therefrom, mixing the clay mineral particles smaller than 2 mm in size with from 0.2% to 5% by weight of a water dispersible additive having colloidal properties in water to form a mixture having a final moisture content not exceeding 15% by weight, compacting the mixture in a press to form compacted masses of the clay mineral particles and breaking the compacted masses into particles larger in size that the selected clay mineral particles and in the 710 micron to 4 mm size range.

2. The process as claimed in claim 1 wherein the clay mineral is a smectite, attapulgite or sepiolite.

3. The process as claimed in claim 1 wherein the compacted mixture is formed into a first fraction which comprises particles in the 1.68 mm to 4 mm size range and a second fraction which comprises particles in the 710 microns to below 1.68 mm size range, the first fraction being present in from 2 to 12 times by weight of the second fraction.

4. The process as claimed in claim 1 wherein the particles to be compacted are in the 105 micron to 710 micron range.

5. The process as claimed in claim 1 wherein said mixture has been compacted between rolls of a roll press under a pressure of from 5 KN to 200 KN per cm of roll length.

6. The process as claimed in claim 1 wherein the clay mineral to be compacted has a moisture content of from 5% to 15% by weight.

7. The process as claimed in claim 1 wherein the additive is selected from the group consisting of silicates, pyrophosphates, and polysaccharides.

8. The process as claimed in claim 7 wherein the additive is selected from the silicates and the polysaccharides.

9. The process as claimed in claim 8 wherein the additive is selected from alkali metal silicates, cellulose derivatives, alginates and starch.

10. The process as claimed in claim 7 wherein the quantity of the additive is from 0.5 to 5% by weight.

11. The process as claimed in claim 1 wherein the clay mineral has a water absorbency %, measured as described herein, of at least 60%.

12. A process for the manufacture of an absorbent material as claimed in claim 1 comprising forming the particles by compacting the smaller particles between rollers under a pressure of at least 5KN per cm of roll length.

13. The process of claim 5 wherein the compaction is performed in a static press under a pressure of 0.5 to 50 KN/sq. cm.

* * * * *